United States Patent
Orzelski et al.

(10) Patent No.: US 8,690,238 B2
(45) Date of Patent: Apr. 8, 2014

(54) ACTIVE HEAD RESTRAINT SYSTEM FOR AN AUTOMOTIVE VEHICLE SEAT

(75) Inventors: Zbigniew J. Orzelski, Bloomfield Hills, MI (US); David Michael Masters, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1082 days.

(21) Appl. No.: 12/013,930

(22) Filed: Jan. 14, 2008

(65) Prior Publication Data
US 2009/0179468 A1 Jul. 16, 2009

(51) Int. Cl.
*B60N 2/427* (2006.01)

(52) U.S. Cl.
USPC .................................................. 297/216.12

(58) Field of Classification Search
USPC ............................................ 297/216.12, 408
See application file for complete search history.

(56) References Cited

U.S. PATENT DOCUMENTS

| | | | |
|---|---|---|---|
| 5,795,019 A | 8/1998 | Wieclawski | |
| 5,829,838 A * | 11/1998 | Offenbacher | 297/408 |
| 6,250,714 B1 * | 6/2001 | Nakano et al. | 297/216.12 |
| 6,416,125 B1 * | 7/2002 | Shah et al. | 297/216.12 |
| 6,568,753 B1 | 5/2003 | Watanabe | |
| 6,631,949 B2 | 10/2003 | Humer et al. | |
| 6,631,955 B2 | 10/2003 | Humer et al. | |
| 6,655,733 B2 | 12/2003 | Humer et al. | |
| 6,749,256 B1 | 6/2004 | Klier et al. | |
| 6,983,996 B2 | 1/2006 | Svantesson | |
| 7,097,242 B2 * | 8/2006 | Farquhar et al. | 297/216.12 |
| 7,104,602 B2 * | 9/2006 | Humer et al. | 297/216.12 |
| 7,204,552 B2 * | 4/2007 | Ishizuka | 297/216.12 |
| 7,374,239 B1 * | 5/2008 | Jayasuriya et al. | 297/216.12 |
| 2002/0050729 A1 | 5/2002 | Nakano | |
| 2004/0075312 A1 * | 4/2004 | Neale | 297/216.12 |
| 2006/0255632 A1 * | 11/2006 | Sugimoto | 297/216.12 |

* cited by examiner

*Primary Examiner* — Peter Brown
(74) *Attorney, Agent, or Firm* — Vichit Chea; Price Heneveld LLP (57) ABSTRACT

An active head restraint system for a vehicle seat includes a head restraint, force pad and connectors. The head restraint and force pad are connected via the connectors. The active head restraint system is connected with a frame of the vehicle seat such that rearward movement of the force pad results in forward movement of the head rest. Springs attached to the active head restraint system and a frame of the seat are used to resist the rearward movement of the force pad.

17 Claims, 6 Drawing Sheets

ACTIVE HEAD RESTRAINT SYSTEM FOR AN AUTOMOTIVE VEHICLE SEAT

FIELD OF THE INVENTION

The invention relates to active head restraint systems for automotive vehicle seats.

DISCUSSION

Automotive vehicle seats may include a head restraint positioned at a top of a seat back. Some head restraints may be adjustable. Adjustable head restraints are configured to move up and down relative to the seat back. Some head restraints may be active. Active head restraints are configured to move forward relative to the seat back during a rear impact event.

A head restraint may be connected with a seat back via mounting posts. The mounting posts are anchored to a structure forming the head restraint. Mounting posts of an adjustable head restraint are moveable relative to the seat back.

A head restraint of an automotive vehicle seat limits rearward movement of a head of an occupant. During a rear impact event, the occupant may be pressed into the seat due to differences in velocity between the seat and the occupant. As the occupant is pressed into the seat, the head of the occupant contacts the head restraint after some delay.

SUMMARY

An active head restraint system for an occupant of an automotive vehicle seat includes a head restraint to support a head of the occupant and a push plate to receive a back of the occupant. The system also includes a connector assembly connected with the push plate and head restraint. The connector assembly may be movably attached with the cross member via a sleeve or a hinge at a location between first and second side members of the seat such that aft movement of the push plate results in fore movement of the head restraint.

An automotive vehicle seat includes a seat back with a cross member. The cross member is disposed between first and second side members of the seat back. The seat also includes an active head restraint assembly rotatively attached with the cross member. The active head restraint assembly includes a head restraint to support a head of the occupant and a push plate to receive a back of the occupant. The cross member is sandwiched between the head restraint and push plate. The push plate moves toward a rear of the vehicle and the head restraint moves toward a front of the vehicle in response to occupant intrusion into the seat back during vehicle impact.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Figure 1:
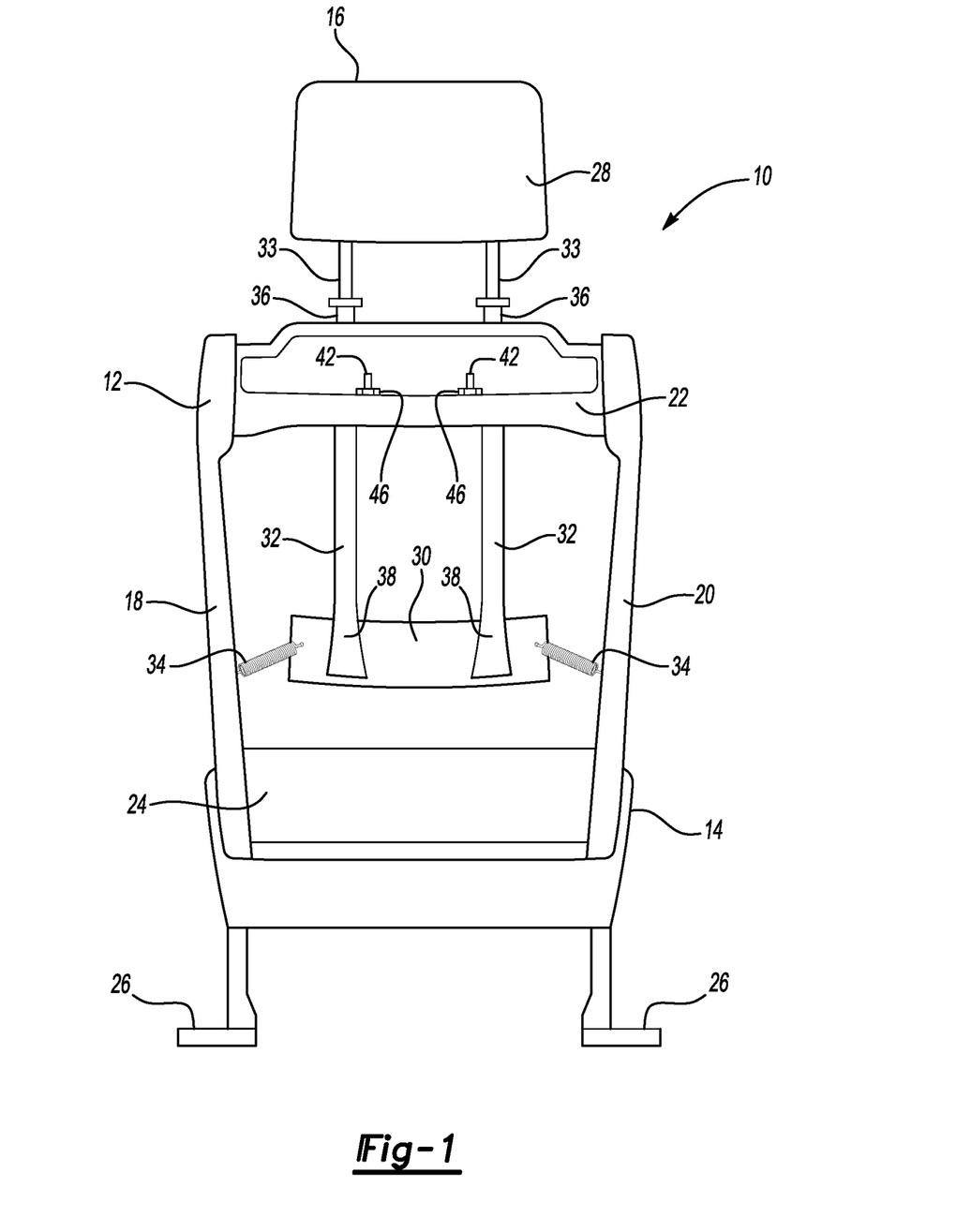
FIG. 1 is a rear view of an automotive seat back frame in accordance with certain embodiments of the invention.

An automotive vehicle seat 10 of FIG. 1 includes a seat back 12, seat bottom 14 and active head restraint system 16. The seat back 12 includes side support members 18, 20 and upper and lower cross members 22, 24. In the example of FIG. 1, the side support members 18, 20 are welded with the upper and lower cross member 22, 24 to form the seat back 12. In other examples, the members 18, 20, 22, 24 may be fastened, e.g., bolted, or otherwise connected to form the seat back 12. The seat back 12 provides support for a back seat cushion (not shown). The seat back 12 is movably attached with the seat bottom 14. For example, the seat back 12 is adjustable relative to the seat bottom 14. The seat back transfers occupant loads to the seat bottom 14.

The seat bottom 14 is attached, e.g., bolted, with a floor of a vehicle (not shown) at bolt plates 26. The seat bottom 14 provides support for a bottom seat cushion (not shown) and transfers occupant loads to the floor of the vehicle.

The exemplary active head restraint system 16 includes a head restraint 28, force pad 30, and generally cylindrical connectors 32, 33. The force pad 30 may include padding, e.g., a foam cushion, (not shown). The active head restraint system 16 also includes springs 34 and guide sleeves 36. As explained below, the active head restraint system 16 is connected with the seat back 12 such that as the force pad 30 moves toward the rear of the vehicle, the head restraint 28 moves toward the front of the vehicle.

In the example of FIG. 1, the springs 34 are attached, e.g., hooked, with the force pad 30 and respective side support members 18, 20. In other examples, the springs 34 may be attached with the connectors 32 or other components. The stiffness of the springs 34 may be selected to tune the active head restraint system 16. For example, the stiffness of the springs 34 may be selected such that a force generated by a rear impact event will result in movement of the force pad 30.

Figure 2:
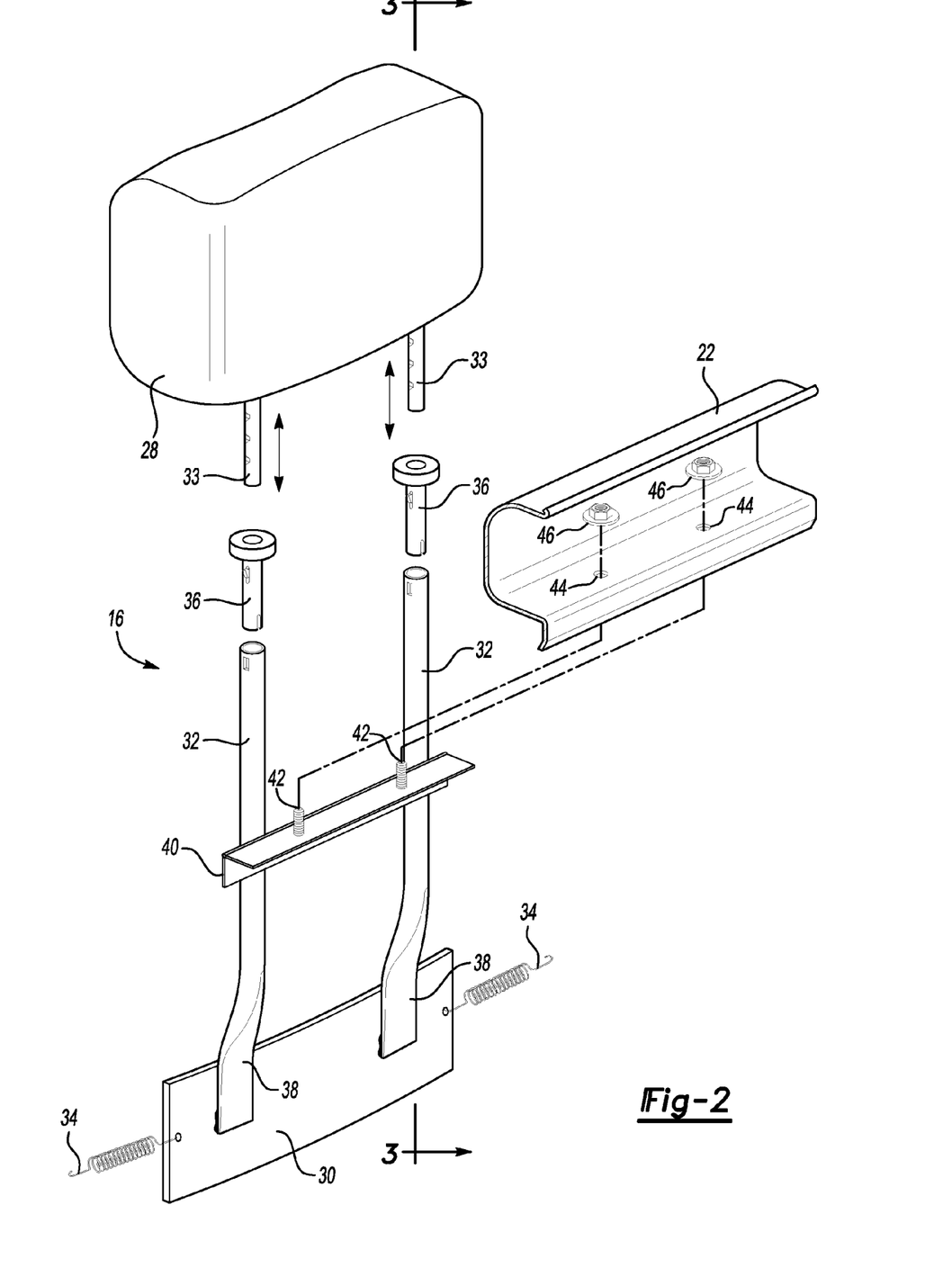
FIG. 2 is rear perspective view, partially exploded, of the active head restraint system and portion of the upper cross member of FIG. 1.

As may be seen in FIG. 2, the head restraint 28 is adjustable in height (as indicated by arrow) relative to the seat back 12 (FIG. 1). The connectors 33 slide within the guide sleeves 36. The guide sleeves 36 further provide a conventional locking mechanism to lock the connectors 33, and thus the head restraint 28, at the desired height.

For packaging reasons, the connectors 32 include flattened portions 38. As the force pad 30 moves toward the rear of the vehicle, the flattened portions 38 of the connectors 32 remain within packaging space defined by a rear seat cover (not shown).

In the example of FIG. 2, the connectors 32 are welded with the force pad 30. In other examples, the connectors 32 may be fastened or otherwise connected with the force pad 30. For example, the force pad 30 may be molded in plastic and include slots that receive ends of the connectors 32. These ends may snap into the slots.

The connectors 32 are welded with a hinge 40, e.g., a hinge similar to a common door hinge. The hinge 40 includes weld studs 42. The upper cross member includes openings 44 to receive the weld studs 42. Hex nuts 46 are used to mechanically fasten the hinge 40 with the upper cross member 22. In other examples, two hinges may be used.

Figure 3:
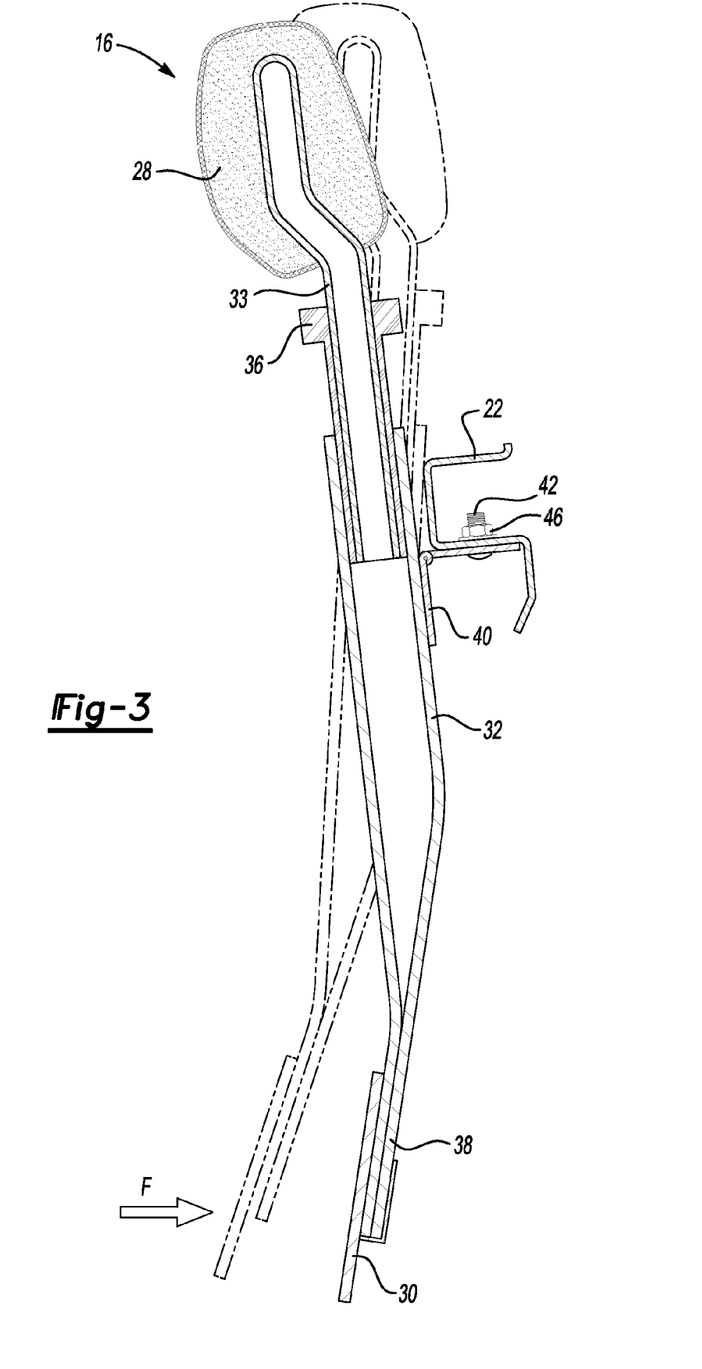
FIG. 3 is a side view, in cross-section, of the active head restraint system of FIG. 2 taken along line 3-3 of FIG. 2.

As may be seen in FIG. 3, the active head restraint system 16 is in its initial state (as indicated by phantom line) and its rotated state (as indicated by solid line). During a rear impact event, a force F directed toward the rear of the vehicle may be generated due to differences in velocity between the vehicle and an occupant. As a result, the occupant is pushed into the seat 10 (FIG. 1). This force F overcomes the spring force of springs 34 (FIGS. 1 and 2) and moves the force pad 30 toward the rear of the vehicle. The active head restraint system 16 rotates about a pin of the hinge 40. The head restraint 28 moves toward the front of the vehicle limiting the rearward movement of a head of the occupant.

Figure 4:
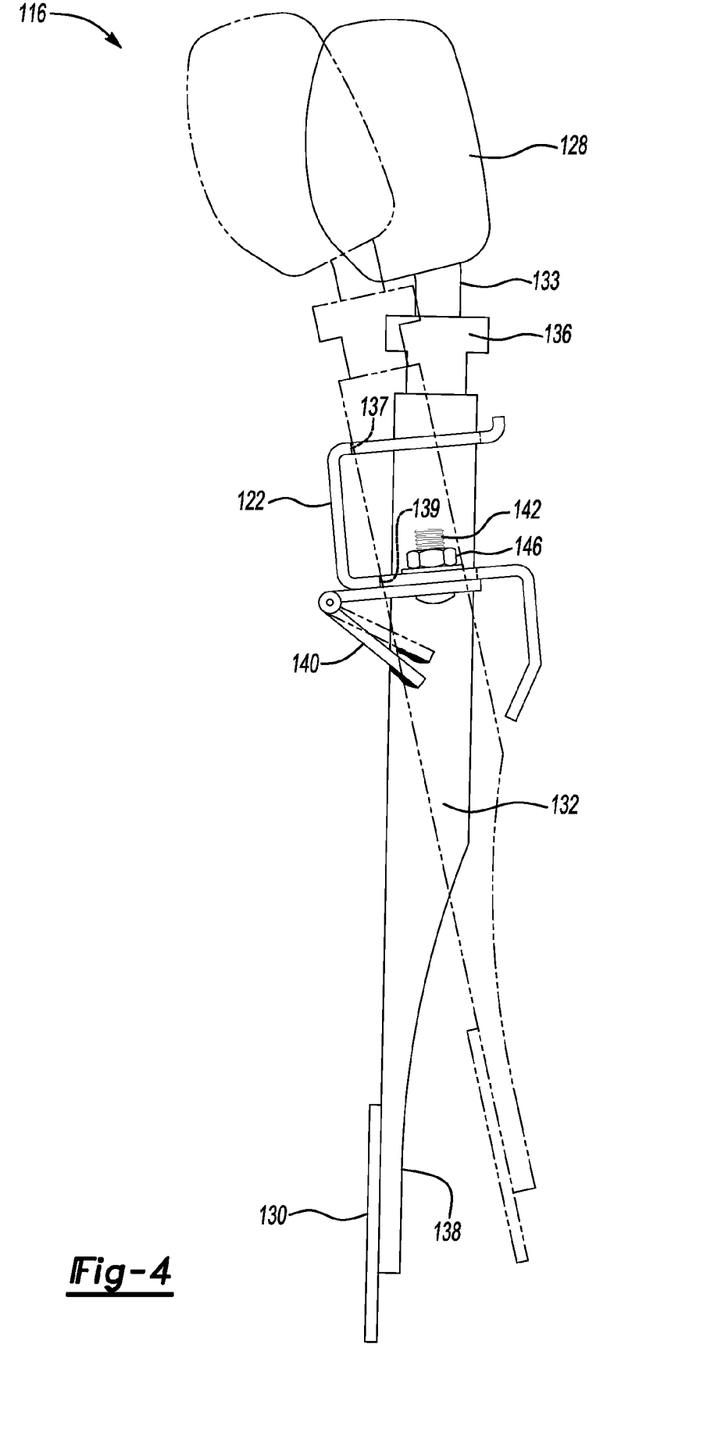
FIG. 4 is a side view of a portion of another exemplary head restraint system in accordance with certain embodiments of the invention.

The active head restraint system 116 of FIG. 4 is in its initial state (as indicated by solid line) and its rotated state (as indicated by phantom line). Numbered elements of FIG. 4 differing by 100 relative to numbered elements of FIGS. 1-3 have similar, although not necessarily identical, descriptions to the number elements of FIGS. 1-3. The connectors 132 pass through openings 137, 139 of the cross member 122.

Figure 5:
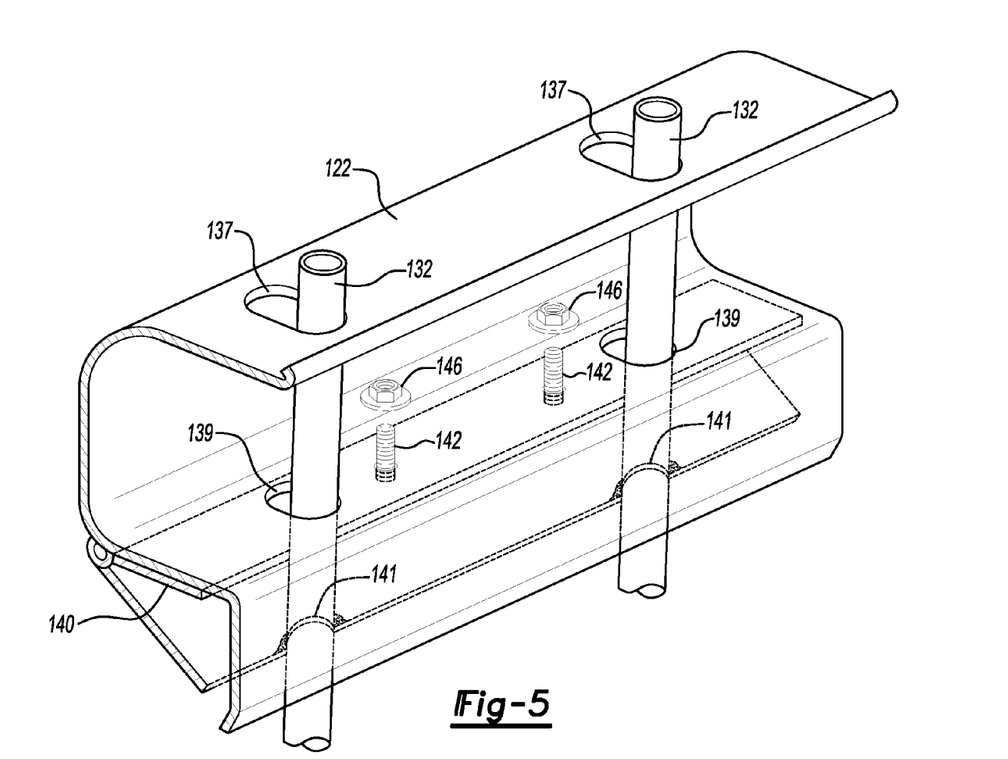
FIG. 5 is a rear perspective view of a portion of the active head restraint system and upper cross member of FIG. 4.

As may be seen in FIG. 5, the hinge 140 has material removed at notches 141. These notches 141 receive the connectors 132. The connectors 132 are welded to the hinge 140 at the notches 141.

Figure 6:
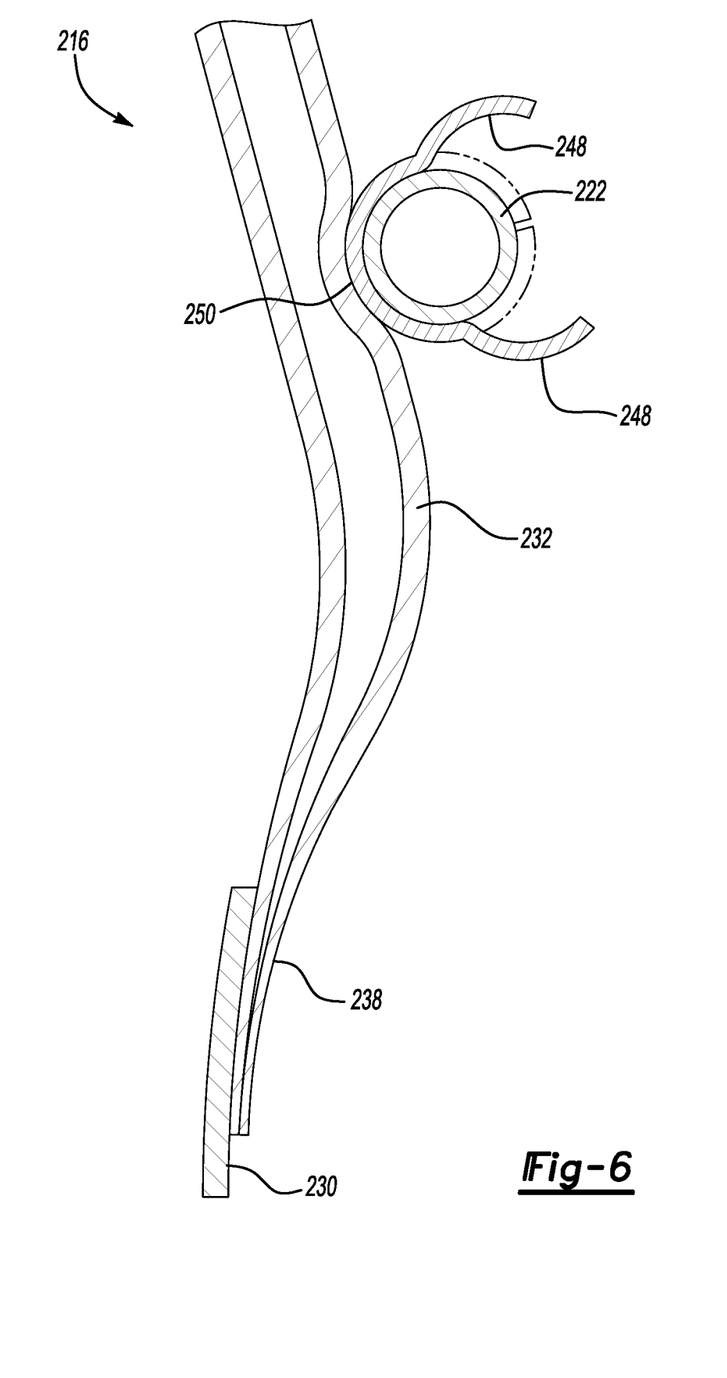
FIG. 6 is a side view, in cross-section, of a portion a yet another exemplary head restraint system in accordance with certain embodiments of the invention.

Active head restraint system 216 of FIG. 6 includes a force pad 230 and generally cylindrical connectors 232. Numbered elements of FIG. 6 differing by 200 relative to numbered elements of FIGS. 1-3 have similar, although not necessarily identical, descriptions to the numbered elements of FIGS. 1-3.

In the example of FIG. 6, an upper cross member 222 has a circular cross-section. A sleeve 248 is crimped onto the upper cross member 222. The sleeve 248 is shown in the un-crimped position (as indicated by solid line) and the crimped position (as indicated by phantom line). The sleeve 248 is welded to the connectors 232. The inner diameter of the sleeve 248 is sized relative to the outer diameter of the cross member 222 such that the sleeve 248 rotates about the cross member 222.

As discussed above, during a rear impact event, a force directed toward the rear of the vehicle may be generated due to differences in velocity between the vehicle and an occupant. This force overcomes the spring force of springs 234 (not shown) and moves the force pad 230 toward the rear of the vehicle. The active head restraint system 216 rotates about a center line of the cross member 222 via the sleeve 248.

Figure 7:
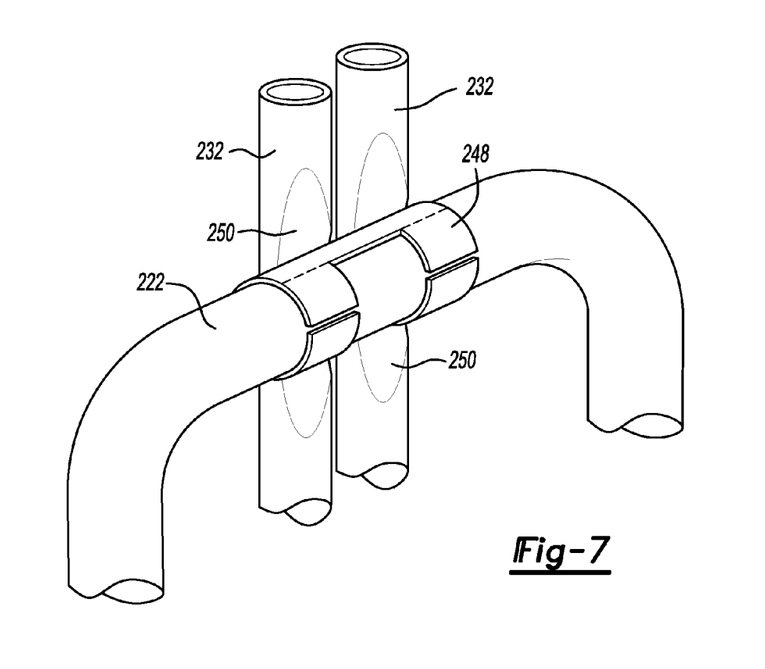
FIG. 7 is a rear perspective view of a portion of the sleeve and cross member of FIG. 6.

As may be seen in FIG. 7, the connectors 232 include a hemispherical depression 250. The sleeve 248 is welded to the connectors 232 at the hemispherical depression 250.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An active head restraint system for an occupant of an automotive vehicle seat having first and second side members and a cross member, the system comprising:
   a head restraint to support a head of the occupant;
   a push plate to receive a back of the occupant during vehicle impact; and
   a connector assembly connected with the push plate and head restraint, the connector assembly passing through and being fixedly and pivotally connected to the cross member at a location between the first and second side members such that aft movement of the push plate results in fore movement of the head restraint:
   wherein the head restraint and the push plate pivot about the location;
   wherein the connector assembly includes at least one rod extending between the head restraint and the push plate; and
   the cross member includes an elongated slot for each rod passing therethrough, the elongated slot allowing the at least one rod of the connector assembly to slide along a length of the elongated slot along with allowing the at least one rod of the connector assembly to slide through the elongated slot.

2. The active head restraint system of claim 1, wherein:
   the at least one rod is pivotally connected to the cross member by a hinge;
   the hinge includes a notch for each at least one rod, the at least one rod being located within the notch and connected to the hinge at the notch.

3. The active head restraint system of claim 1, wherein:
   the cross member is C-shaped and includes a top plate and a bottom plate, the top and bottom plates having a pair of the elongated slots allowing the at least one rod of the connector assembly to slide along a length of the pair of elongated slots along with allowing the at least one rod of the connector assembly to slide through the pair of elongated slots.

4. The active head restraint system of claim 3, wherein:
   the at least one rod is pivotally connected to the cross member by a hinge;
   the hinge includes a notch for each at least one rod, the at least one rod being located within the notch and connected to the hinge at the notch.

5. An active head restraint system for an occupant of an automotive vehicle seat having first and second side members and a cross member, the system comprising:
   a head restraint to support a head of the occupant;
   a push plate to receive a back of the occupant during vehicle impact; and
   a connector assembly connected with the push plate and head restraint, the connector assembly passing through and being fixedly and pivotally connected to the cross member at a location between the first and second side members such that aft movement of the push plate results in fore movement of the head restraint;
   wherein the head restraint and the push plate are allowed to freely pivot about the location between an initial position and an activated position and between the activated position and the initial position;
   wherein the head restraint and the push plate are allowed to freely pivot about the location between the initial position and the activated position and between the activated position and the initial position during an impact event such that the head restraint and the push plate are not prohibited from moving between the initial position and the activated position and between the activated position and the initial position;
   wherein the connector assembly includes at least one rod extending between the head restraint and the push plate; and
   the cross member includes an elongated slot for each rod passing therethrough, the elongated slot allowing the at least one rod of the connector assembly to slide along a length of the elongated slot along with allowing the at least one rod of the connector assembly to slide through the elongated slot.

6. The active head restraint system of claim 5, wherein:
the at least one rod is pivotally connected to the cross member by a hinge;
the hinge includes a notch for each at least one rod, the at least one rod being located within the notch and connected to the hinge at the notch.

7. The active head restraint system of claim 5, wherein:
the cross member is C-shaped and includes a top plate and a bottom plate, the top and bottom plates having a pair of the elongated slots allowing the at least one rod of the connector assembly to slide along a length of the pair of elongated slots along with allowing the at least one rod of the connector assembly to slide through the pair of elongated slots.

8. The active head restraint system of claim 7, wherein:
the at least one rod is pivotally connected to the cross member by a hinge;
the hinge includes a notch for each at least one rod, the at least one rod being located within the notch and connected to the hinge at the notch.

9. An automotive vehicle seat having first and second side members, the seat comprising:
a seat back including a cross member to support a back of the occupant, the cross member being disposed between the first and second side members;
an active head restraint assembly passing through the cross member and being fixedly and pivotally connected to the cross member at a pivot point, the active head restraint assembly including a head restraint assembly including a head restraint to support a head of the occupant and a push plate to receive the back of the occupant during vehicle impact, the cross member being located between the head restraint and the push plate and the push plate moving toward a rear of the vehicle and the head restraint moving toward a front of the vehicle in response to occupant intrusion into the seat back during vehicle impact;
wherein the head restraint and the push plate pivot about the pivot point;
wherein the active head restraint assembly includes a connector assembly connecting the head restraint to the push plate;
the connector assembly is pivotally connected to the cross member at the pivot point;
wherein the connector assembly includes at least one rod extending between the head restraint and the push plate; and
the cross member includes an elongated slot for each rod passing therethrough, the elongated slot allowing the at least one rod of the connector assembly to slide along a length of the elongated slot along with allowing the at least one rod of the connector assembly to slide through the elongated slot.

10. The automotive vehicle seat of claim 9, wherein:
the at least one rod is pivotally connected to the cross member by a hinge;
the hinge includes a notch for each at least one rod, the at least one rod being located within the notch and connected to the hinge at the notch.

11. The automotive vehicle seat of claim 9, wherein:
the cross member is C-shaped and includes a top plate and a bottom plate, the top and bottom plates having a pair of the elongated slots allowing the at least one rod of the connector assembly to slide along a length of the pair of elongated slots along with allowing the at least one rod of the connector assembly to slide through the pair of elongated slots.

12. The automotive vehicle seat of claim 11, wherein:
the at least one rod is pivotally connected to the cross member by a hinge;
the hinge includes a notch for each at least one rod, the at least one rod being located within the notch and connected to the hinge at the notch.

13. An automotive vehicle seat having first and second side members, the seat comprising:
a seat back including a cross member to support a back of the occupant, the cross member being disposed between the first and second side members; and
an active head restraint assembly passing through the cross member and being pivotally connected to the cross member at a pivot point, the active head restraint assembly including a head restraint assembly including a head restraint to support a head of the occupant and a push plate to receive the back of the occupant during vehicle impact, the cross member being located between the head restraint and the push plate, the push plate moving toward a rear of the vehicle and the head restraint moving toward a front of the vehicle in response to occupant intrusion into the seat back during vehicle impact, and the push plate being able to move toward the front of the vehicle and the head restraint being able to move toward the rear of the vehicle after the occupant intrusion into the seat back after the vehicle impact;
wherein the head restraint and the push plate are allowed to freely pivot about the pivot point between an initial position and an activated position and between the activated position and the initial position;
wherein the head restraint and the push plate are allowed to freely pivot about the location between the initial position and the activated position and between the activated position and the initial position during an impact event such that the head restraint and the push plate are not prohibited from moving between the initial position and the activated position and between the activated position and the initial position;
wherein the active head restraint assembly includes a connector assembly connecting the head restraint to the push plate;
the connector assembly is pivotally connected to the cross member at the pivot point;
wherein the connector assembly includes at least one rod extending between the head restraint and the push plate; and
the cross member includes an elongated slot for each rod passing therethrough, the elongated slot allowing the at least one rod of the connector assembly to slide along a length of the elongated slot along with allowing the at least one rod of the connector assembly to slide through the elongated slot.

14. The automotive vehicle seat of claim 13, wherein:
the at least one rod is pivotally connected to the cross member by a hinge;
the hinge includes a notch for each at least one rod, the at least one rod being located within the notch and connected to the hinge at the notch.

15. The automotive vehicle seat of claim 13, wherein:
the cross member is C-shaped and includes a top plate and a bottom plate, the top and bottom plates having a pair of the elongated slots allowing the at least one rod of the connector assembly to slide along a length of the pair of elongated slots along with allowing the at least one rod of the connector assembly to slide through the pair of elongated slots.

16. The automotive vehicle seat of claim 15, wherein:

the at least one rod is pivotally connected to the cross member by a hinge;

the hinge includes a notch for each at least one rod, the at least one rod being located within the notch and connected to the hinge at the notch.

17. A seat having side members and a cross member comprising:

a head restraint, a push plate and an assembly connected there between;

the assembly being fixedly and pivotally connected to the cross member between the side members with aft movement of the push plate resulting in fore movement of the head restraint;

the cross member including a slot for allowing the assembly to slide both along a length of the slot and through the slot.

\* \* \* \* \*